United States Patent [19]

Terai

[11] Patent Number: 5,273,310
[45] Date of Patent: Dec. 28, 1993

[54] INSTRUMENT PANEL STRUCTURE FOR AUTOMOTIVE VEHICLE

[75] Inventor: Takehiro Terai, Atsugi, Japan

[73] Assignee: Nissan Motor Co., Ltd., Yokohama, Japan

[21] Appl. No.: 51,866

[22] Filed: Apr. 26, 1993

[30] Foreign Application Priority Data

Apr. 28, 1992 [JP] Japan .................................. 4-108263

[51] Int. Cl.⁵ ............................................ B60R 21/16
[52] U.S. Cl. ...................................... 280/732; 296/70; 180/90
[58] Field of Search .................. 280/732, 730, 752 R; 292/70, 208; 180/90

[56] References Cited

U.S. PATENT DOCUMENTS 5,135,253 4/1992 Hiroshima et al. ................. 280/732
5,190,314 3/1993 Takasugi ............................ 280/732

FOREIGN PATENT DOCUMENTS 0378314 7/1990 European Pat. Off. ............ 280/732
2-303952 12/1990 Japan .
3-16555 2/1991 Japan .

Primary Examiner—Margaret A. Focarino
Assistant Examiner—Christopher P. Ellis
Attorney, Agent, or Firm—Foley & Lardner

[57] ABSTRACT

An instrument panel assembly for an automotive vehicle includes a main panel having first and second openings formed therethrough. An air bag unit is mounted in the first, upper opening and a vehicle glove box is fitted in the second lower opening. A steering member is disposed behind the main panel and mounts the air bag unit. The first opening is closed by a lid which is retained by a lock associated with a bracket for guiding an inflation direction of an air bag. A vent duct is disposed in a space between the first and second openings proximate the steering member such that the steering member and the ductwork act so as to isolate the air bag unit, a vehicle air conditioning unit and the glove box from each other to assure reliable operation of all components with a simple low cost instrument panel assembly.

10 Claims, 2 Drawing Sheets

INSTRUMENT PANEL STRUCTURE FOR AUTOMOTIVE VEHICLE

BACKGROUND OF THE INVENTION

1. Field of The Invention

The present invention relates generally to a construction for an instrument panel of an automotive vehicle. Specifically, the invention relates to an automotive instrument panel arrangment in which separation of components is assured with fewer parts and lower weight.

2. Description of The Prior Art

In modern automotive vehicles, air bag units are a commonly employed safety feature. Recently it has become practice to provide such an air bag unit in a portion of a vehicle instrument panel on the passenger side of the vehicle interior compartment. Such passenger side air bag arrangements are disclosed for example in Japanese Patent Application (first publication) 2-303952 and Japanese Utility Model Application 3-16555.

Generally, the above documents disclose a instrument panel disposed on a passenger side of an interior compartment of an automotive vehicle. An opening is provided in the instrument panel substantially in front of a passenger seat and an air bag unit mounted on a steering member are disposed in the opening. The air bag unit is installed and adjusted such that, in a vehicle collision or other emergency condition, the air bag unit is operative to inflate an air bag disposed therein such that a lid, disposed over the opening, is pushed open and the air bag quickly inflated so as to emerge from the opening and move into the vehicle interior compartment for protectively restricting the vehicle passenger.

Generally, a glove box is provided at a position in front of the passenger seat and below the opening in which the air bag is disposed. Since the airbag must be securely mounted and maintained, the glove box should not come into contact with the instrument panel opening in which the air bag unit is contained, and a cover is installed to assure separation of the glove box from the air bag unit. This tends to raise costs as well as the weight and number of parts.

Further, since air conditioning and/or ventilation ducts must also be accommodated behind a vehicle instrument panel, additional structure has also been necessary for assuring separation of vehicle ductwork and air conditioning units from the air bag unit and the glove box, such that all components may operate efficiently without interference from the other components. This additional structure has tended to raise costs, weight and complexity of instrument panel assemblies for automotive vehicles.

Thus, it has been required to provide an instrument panel assembly in which separation of components is assured with fewer parts and lower weight.

SUMMARY OF THE INVENTION

It is therefore a principal object of the present invention to overcome the drawbacks of the prior art.

It is a further object of the present invention to provide an automotive instrument panel structure in which various components of operative behind the panel are suitably isolated from each other without need of partitions of excessive additional structure so as to keep costs down and simplify assembly.

In order to accomplish the aforementioned and other objects, an instrument panel assembly for an automotive vehicle is provided, comprising: a main panel having formed therethrough a first upper opening and a second lower opening, a lid removably retained in the first upper opening, a glove box openably and closably disposed in the second lower opening, a steering member disposed axially in a width direction of the vehicle substantially between the glove box and the first upper opening and provided, at a side corresponding to a passenger side of the vehicle, with a mounting bracket, an air bag unit including an air bag and means for inflating the air bag mounted to the mounting bracket of the steering member, a vent duct arranged substantially in front of the steering member and between the first upper and second lower openings, the vent duct and the steering member being so positioned as to substantially partition an area occupied by the glove box from an area occupied by the air bag unit, and an air bag bracket mounted substantially at a lower side of the first upper opening.

DESCRIPTION OF THE PREFERRED EMBODIMENT

Figure 1:
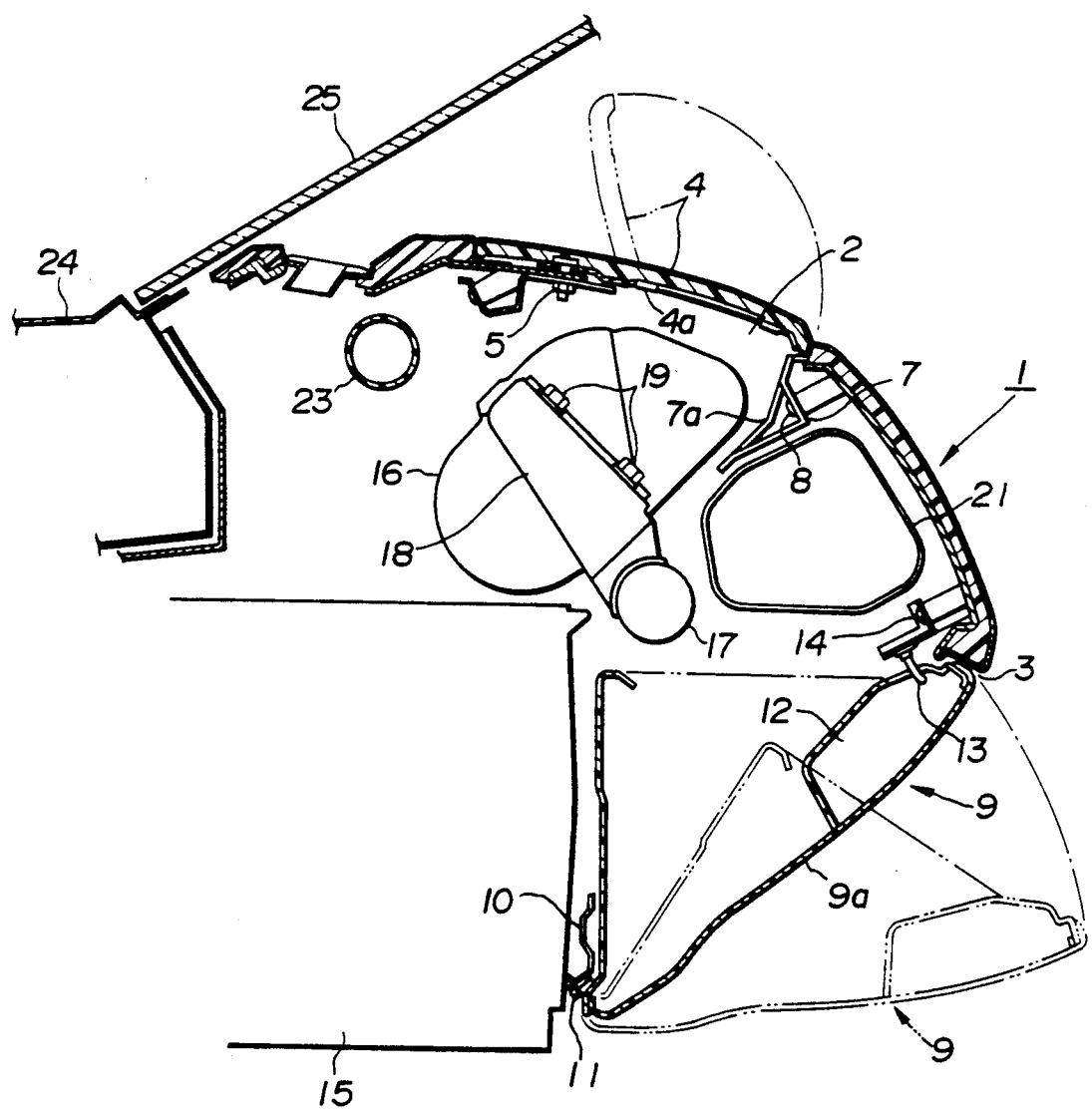
FIG. 1 is a cross-sectional view of an automotive instrument panel structure according to a preferred embodiment of the invention.

Referring now to the drawings, particularly to FIG. 1, a vehicle instrument panel 1 includes an upper air bag opening 2 for receiving an air bag unit 16 therein and a lower glove box opening 3 for receiving therein a glove box 9. A lid 4 is disposed over the opening 2 and is retained in place by a bolt 5. The inner surface of the lid 4 is a bendable plate 4a which allows the lid 4 to pivotally open in the upward direction upon activation of an air bag unit 16.

At a lower or forward edge of the upper air bag opening 2 an air bag bracket 7 is provided. The air bag bracket 7 includes an air bag guide portion 7a and is held in place by a screw 8. The air bag guide portion 7a directs an air bag (not shown) of the air bag unit 16 into the vehicle interior compartment (not shown) during inflation. Further, referring to FIG. 2, at ends of the bracket 7 air bag lock portions 6, 6 are provided for engaging tabs 4b of the lid 4 for retaining the air bag lid 4 securely in place.

As mentioned above, the glove box 9 is fitted into the lower glove box opening 3 of the instrument panel 1. As may be seen in FIG. 1 a reinforcing plate 10 is provided at a lower side of the glove box opening 3 which is associated with a pin 11 for pivotally mounting the glove box 9 such that it may be freely opened and closed. At the front side of the glove box 9, a glove box lid 9a is provided which includes a lid lock 12 which engages a striker 13 retained in place by a screw 14 at an upper side of the lower glove box opening 3.

Still referring to FIG. 1, it may be seen that the glove box 9 is installed in front of and adjacent to a vehicle air conditioning unit 15, above which the air bag unit 16 is mounted so as to be properly positioned relative the upper air bag opening 2. The air bag unit 16 is mounted via bolts 19 to a mounting bracket 18 attached to a vehicle steering member 17 which, as may be seen in the drawings, is provided in a fixed substantially central position behind the instrument panel 1.

Figure 2:
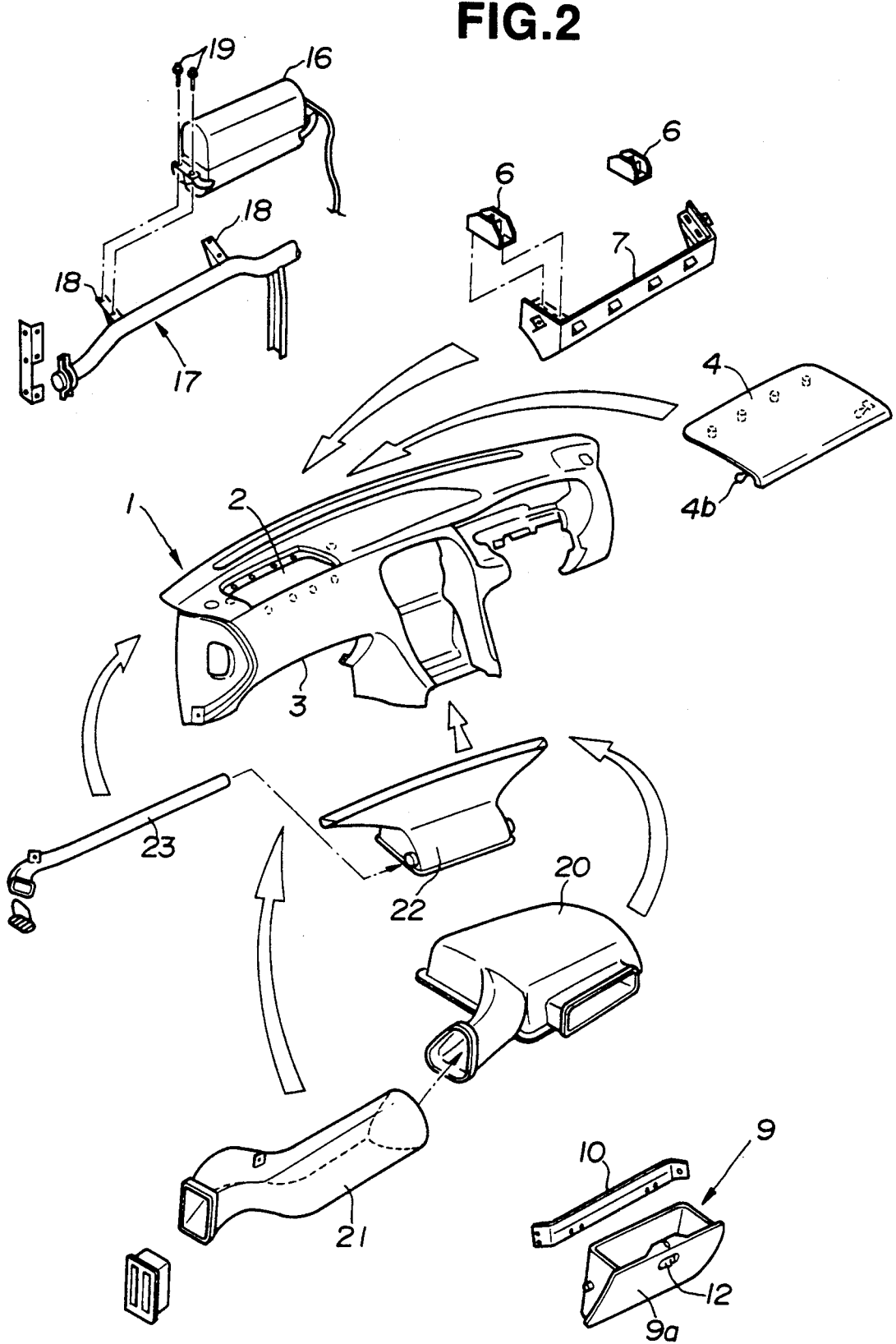
FIG. 2 is an exploded perspective view of the instrument panel structure of FIG. 1.

Further, referring to FIG. 2, ductwork associated with the vehicle air conditioning unit 15 and/or a vehicle ventilation system (not shown) is further installed behind the instrument panel 1 so as to provide air ducts appropriately within the vehicle without interfering with operation of the air bag unit 16 or the glove box 9. According to this a central duct vent 20 is provided in a substantially central location behind the instrument panel 1, the central duct vent 20 being attached to a side duct 21 which, as may be seen in FIG. 1, passes above the glove box 9 and below the air bag bracket 7. Further, a front defrost duct 22 is provided at an upper rear location behind the instrument panel 1, the front defrost duct 22 being connected with a side defrost duct 23 which passes above and behind the mounted air bag unit 16 (see FIG. 1).

As may further be seen in FIG. 1, the front defrost duct 22 is mounted behind an cowl box 24 of the automotive vehicle and below a windshield 25 thereof.

Thus, according to the invention, vehicle ductwork may be installed without interruption or significant detouring behind the instrument panel 1 and on either side of a glove box 9 and an air bag unit 16 without interfering therewith or being interfered with thereby, since the air bag unit 16, the air conditioning unit 15 and the glove box 9 are isolated, or separated, from each other by the steering member 17 and the duct vent 20. Thus, additional structure for effecting such separation is not required and the structure is simplified while costs, parts and weight are reduced.

Further, since the air bag unit 16 is mounted forward of the air conditioning unit 15, and the glove box 9 is mounted forward and below the air bag unit 16, the glove box 9 may open and close without interference, ducts may be suitable provided in the vehicle interior and air bag performance is suitably and reliably provided.

Thus, according to the invention, an air bag unit 16 may be disposed between an air bag opening 2 and a glove box opening 3 of an instrument panel 1 of an automotive vehicle such that, inflation of the air bag may be accomplished without interference from other members mounted behind the instrument panel 1 and without need of providing a 'glove box cover' to divide the air bag opening 2 from the glove box opening 3. Thus, the number of parts is reduced so costs and weight are decreased and ease of installation is enhanced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

WHAT IS CLAIMED IS:

1. An instrument panel assembly for an automotive vehicle, comprising:

a main panel having formed therethrough a first upper opening and a second lower opening;

a lid removably-retained in said first upper opening;

a glove box openably and closably disposed in said second lower opening;

a steering member disposed axially in a width direction of said vehicle substantially between said glove box and said first upper opening and provided, at a side corresponding to a passenger side of said vehicle, with a mounting bracket;

an air bag unit including an air bag and means for inflating said air bag mounted to said mounting bracket of said steering member;

a vent duct arranged substantially in front of said steering member and between said first upper and second lower openings, said vent duct and said steering member being so positioned as to substantially partition an area occupied by said glove box from an area occupied by said air bag unit; and an air bag bracket mounted substantially at a lower side of said first upper opening.

2. An instrument panel assembly as set forth in claim 1, wherein an air conditioning unit is mounted substantially behind said glove box and below said air bag unit mounted on said steering member such that said glove box, said air conditioning unit and said air bag unit are arranged substantially centrally around said steering member.

3. An instrument panel assembly as set forth in claim 1, wherein said air bag bracket further includes an air bag guide portion active to direct an air bag of the air bag unit into a vehicle interior compartment during inflation.

4. An instrument panel assembly as set forth in claim 1, wherein a reinforcing plate is mounted behind said glove box, said reinforcing plate being associated with a pin for forming a hinge for pivotally mounting said glove box at a lower side of said second lower opening.

5. An instrument panel assembly as set forth in claim 1, wherein an inner surface of said lid is a bendable plate which allows the lid to pivotally open in the upward direction upon activation of the air bag unit.

6. An instrument panel assembly as set forth in claim 1, wherein ends of said air bag bracket are provided with air bag lock portions for engaging tabs provided on said lid so as to retain said lid in place.

7. An instrument panel assembly as set forth in claim 1, wherein a glove box lid is provided at a front side of said glove box, said glove box lid including a lid lock which engages a striker retained in place by a screw at an upper side of said second lower opening.

8. An instrument panel assembly as set forth in claim 1, further comprising a central duct provided in a substantially central location behind said instrument panel, said central duct being attached to said vent duct which passes above said glove box and below said air bag bracket.

9. An instrument panel assembly as set forth in claim 8, wherein said central duct is further connected to a front defrost duct further provided at an upper rear location of said instrument panel behind said first upper opening.

10. An instrument panel assembly as set forth in claim 9, wherein said front defrost duct is connected with a side defrost duct which passes above and behind said air bag unit.

* * * * *